(12) United States Patent
Kuroda

(10) Patent No.: US 7,134,801 B2
(45) Date of Patent: Nov. 14, 2006

(54) BALL JOINT AND METHOD OF MANUFACTURING HOUSING THEREFOR

(75) Inventor: Shigeru Kuroda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/114,323

(22) Filed: Apr. 3, 2002

(65) Prior Publication Data

US 2002/0146277 A1 Oct. 10, 2002

(30) Foreign Application Priority Data

Apr. 4, 2001 (JP) .............................. 2001-105592

(51) Int. Cl.
*F16C 11/06* (2006.01)

(52) U.S. Cl. ................... 403/135; 403/50; 403/133; 403/140

(58) Field of Classification Search ............... 403/122, 403/133, 135, 132, 140, 362, 50
See application file for complete search history.

(56) References Cited

U.S. PATENT DOCUMENTS

| 4,154,546 | A | * | 5/1979 | Merrick et al. ............. 403/134 |
| 5,044,811 | A | * | 9/1991 | Suzuki et al. ............... 403/134 |
| 5,150,981 | A | * | 9/1992 | Miwa ......................... 403/122 |
| 5,427,467 | A | * | 6/1995 | Sugiura ...................... 403/140 |
| 5,492,428 | A | * | 2/1996 | Hellon et al. ............... 403/122 |
| 5,997,208 | A | * | 12/1999 | Urbach et al. .............. 403/137 |
| 6,343,889 | B1 | * | 2/2002 | Hendricks et al. .......... 403/143 |

\* cited by examiner

*Primary Examiner*—Kenneth Thompson
(74) *Attorney, Agent, or Firm*—Arent Fox PLLC

(57) ABSTRACT

There is provided a ball joint provided with a ball stud having a spherical head portion in an end portion, a ball seat to which the spherical head portion is slidably fitted, thereby pivoting the ball stud universally, and a housing receiving the ball seat, the housing being structured such that a closed-end cylindrical main body portion and a flange portion extending outward in a radial direction from an edge portion of the main body portion are formed in accordance with sheet metal processing. The flange portion is formed thinner than a thickness of the main body portion.

6 Claims, 5 Drawing Sheets

BALL JOINT AND METHOD OF MANUFACTURING HOUSING THEREFOR

BACKGROUND OF THE INVENTION

1. Technical Field

The present invention relates to a ball joint which is, for example, used in a connection portion of a stabilizer for a vehicle, and to a method of manufacturing a housing therefor.

2. Related Art

FIG. 4 shows a conventional embodiment of this kind of ball joint. The ball joint is constructed such that a spherical head portion 2a formed in an end portion of a ball stud 2 is slidably fitted to a resin ball seat 3 received within a cylindrical housing 4. The ball stud 2 is pivoted relating to the ball seat 3 in a universal manner around the spherical head portion 2a, that is, in such a manner as to freely tilt and rotate around an axis. A rivet-like engagement portion 3b formed in a bottom portion of the ball seat 3 extends through a bottom portion of the housing 4 so as to be engaged therewith, whereby the ball seat 3 is restricted to the housing 4, thereby preventing it from rotating around the axis and coming off from the housing 4. In this case, reference numeral 6 denotes a bevel-like dust cover, and reference numeral 7 denotes a support bar integrally adhered to the housing 4.

In this case, as shown in enlarged FIG. 5, the housing 4 is constituted by a main body portion 4a formed in a closed-end cylindrical shape, and a ring-like flange portion 4b formed in an edge portion of the main body portion 4a, and is integrally formed in accordance with a sheet metal process from a steel plate. Further, the support bar 7 is electric resistance welded at a position a distance c apart from a lower surface of the flange portion 4b. This is because the welding is applied so as to avoid a circular arc surface formed in a cross portion between the lower surface of the flange portion 4b and the outer peripheral surface of the main body portion 4a, and a space for burrs generated in welding is secured. Further, the spherical head portion 2a of the ball stud 2 is pressure inserted by elastically deforming the ball seat 3. In order to prevent a crack from being generated in the bottom portion of the ball seat 3 in pressure insertion thereof, it is necessary to provide a certain degree of thickness in the bottom portion. Accordingly, it is impossible to move the ball stud 2 very close to the bottom portion side of the ball seat 3. For the reason mentioned above, a center O of the spherical head portion 2a of the ball stud 2 is arranged at a position a distance e shifted from a center line 7a of the support bar 7.

Since the difference of distance e exists between the center of the spherical head portion 2a of the ball stud 2 and the center line 7a of the support bar 7, a bending moment of P×e with respect to a test load P generated by a tensile test or a buckling test in an axial direction of the support bar 7 is applied to the support bar 7. Accordingly, since a strength of the support bar 7 cannot be obtained while a strength obtained by multiplying a cross sectional area of the support bar 7 by a material strength is generally secured, there have been cases in which it is necessary to make the support bar 7 thick for the purpose of satisfying a required specification.

Further, a drawing load F of the ball stud is generally expressed by a smaller value among values calculated by the following formula (1) or (2).

$$F = 4 \times N \times d^3 \times \pi/4 + \mu \times F' \times \eta \times (l_1 \times \pi \times D) \qquad (1)$$

$$F = N \times \pi \times D \times l_2 \qquad (2)$$

In this case, parameters in the respective formulas mentioned above are as follows.

d: diameter of the shaft in engagement portion 3b

N: shear resistance of the ball seat 3

μ: coefficient of friction between the housing 4 and the ball seat 3

η: component force conversion efficiency in the outer peripheral direction due to contact angle between the ball stud 2 and the ball seat 3 when a drawing load is applied to the ball stud 2

$l_1$: distance of the linear portion extending from the crossing point between a normal line and the inner peripheral surface toward the flange portion 4b (distance of the flange portion 4b to the end point of the circular arc surface) when the normal line is formed passing through the center O of the spherical head portion 2a of the ball stud 2 on the inner peripheral surface of the housing 4

F': component serving to provide friction force between an inner peripheral surface of the housing 4 and the ball seat 3 when a drawing load is applied to the ball stud 2

D: diameter of spherical head portion $l_2$: length of thick portion extending from crossing point between normal line and inner peripheral surface toward axial direction of ball stud 2 when a normal line is formed passing through center O of spherical head portion 2a of the ball stud 2 on inner peripheral surface of ball seat 3.

In general, the value calculated by the formula (1) is smaller in the drawing load F. In accordance with the formula (1), in order to increase the drawing load F, the spherical head portion may be made large, or the housing may be made longer so as to set the distance $l_1$ of the linear portion of the inner peripheral surface to be large. However, in such a countermeasure, weight and size are increased, and material costs are unnecessarily increased.

SUMMARY OF THE INVENTION

Accordingly, objects of the present invention are to provide a ball joint which can increase a tensile strength and a buckling strength of a support bar and can increase a drawing strength of a ball stud, and to provide a method of manufacturing a housing therefor.

The present invention provides a ball joint comprising: a ball stud having a spherical head portion in an end portion; a ball seat to which the spherical head portion is slidably fitted, thereby pivoting the ball stud universally; and a housing receiving the ball seat. The housing is structured such that a closed-end cylindrical main body portion and a flange portion extending outward in a radial direction from an edge portion of the main body portion are formed in accordance with a sheet metal process. The flange portion is formed so as to be thinner than a thickness of the main body portion.

In accordance with the ball joint having the structure mentioned above, since the flange portion is formed to be thinner than the thickness of the main body portion, it is possible to move the center line 7a of the support bar 7 in FIG. 5 closer to the center O of the spherical head portion 2a of the ball stud 2. Accordingly, the position difference e between both can be small so as to increase a tensile strength and a buckling strength of the support bar 7.

It is desirable that an outer radius of curvature in a cross section of the crossing point between the flange portion and the main body portion be made smaller than a thickness. Accordingly, the distance $l_1$ of the linear portion of the housing inner peripheral surface becomes long, so that it is possible to increase the drawing strength of the ball stud.

In this case, in order to make the position difference e between the support bar and the spherical head portion, it is desirable that the ball stud be arranged as close as possible to the bottom portion of the ball seat.

Accordingly, it is preferable to form a flat portion in a bottom portion side of the spherical head portion and to set a distance between a center of the spherical head portion and the flat portion to 0.25 to 0.4 times the diameter of the spherical head portion. Further, it is effective to make a thickness of the bottom portion of the ball seat as small as possible. In this case, by providing with a convex portion having a thickness larger than a periphery in a center of the bottom portion, it is possible to prevent a crack from being generated in the bottom portion in pressure inserting the spherical head portion into the ball seat.

When arranging the ball stud close to the bottom portion side, an angle of swing of the ball stud becomes narrow. In order to secure a wide angle of swing, it is possible to form a shaft portion connected to the spherical head portion in a tapered shape which is tapered toward the spherical head portion side.

Next, the present invention also provides a method of manufacturing a housing for a ball joint provided with a closed-end cylindrical main body portion and a flange portion extending outward in a radial direction from an edge portion of the main body portion. The method comprising: forming a closed-end cylindrical body by sheet metal forming; working so as to reduce a thickness of a portion near an opening portion of the cylindrical body; and expanding and opening a portion at which the thickness is reduced, or a forward portion from a portion close to the opening portion, so as to form a flange portion.

In accordance with the manufacturing method mentioned above, since the flange portion is expanded and formed in the portion thinner than the thickness of the raw material, a crossing portion between the flange portion and the main body portion is constructed in the portion thinner than the thickness of the raw material. Accordingly, an outer radius of curvature in a cross section of the crossing portion becomes smaller than the thickness of the raw material. In this case, a well-known method can be employed for the process of reducing the thickness close to the opening portion of the formed body. For example, it is possible to employ a method of clamping an outer periphery of the formed body by a metal mold and inserting a punch having an outer diameter larger than an inner diameter of the formed body to the opening portion. In this case, it is desirable that the thickness after being thinned be between 55 and 65% of the thickness of the raw material.

BRIEF DESCRIPTION OF THE DRAWINGS

FIGS. 1A, 1B, 1C and 1D are views showing a ball joint in accordance with an embodiment of the present invention, in which FIG. 1A is a cross sectional view along a line A—A in FIG. 1C, FIG. 1B is a view as seen from an arrow B in FIG. 1A, FIG. 1C is a view as seen from an arrow C in FIG. 1A and FIG. 1D is a view as seen from an arrow D in FIG. 1A;

FIGS. 4A, 4B,and 4C are views showing a ball seat constituting a conventional ball joint, in which FIG. 4A is a cross sectional view along a line A—A in FIG. 4B, FIG. 4B is a view as seen from an arrow B in FIG. 4A, and FIG. 4C is a view as seen from an arrow C in FIG. 4A.

DESCRIPTION OF THE PREFERRED EMBODIMENT

Figure 1A:
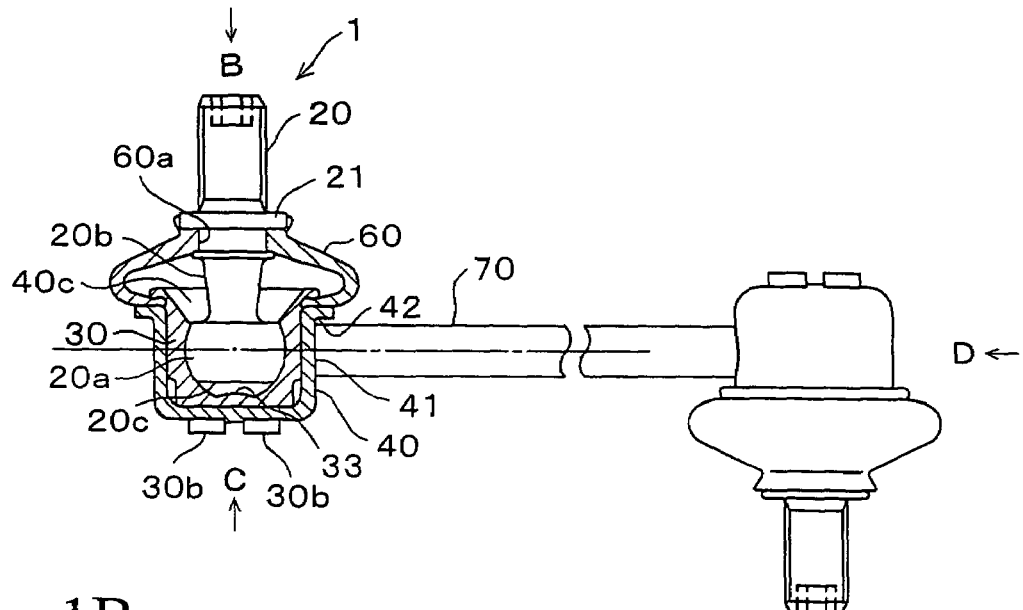
Figure 1B:
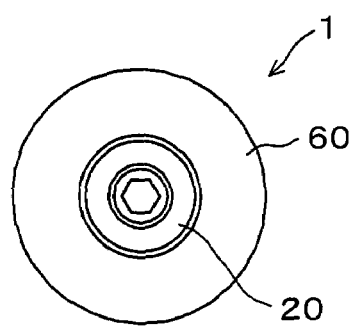
Figure 1D:
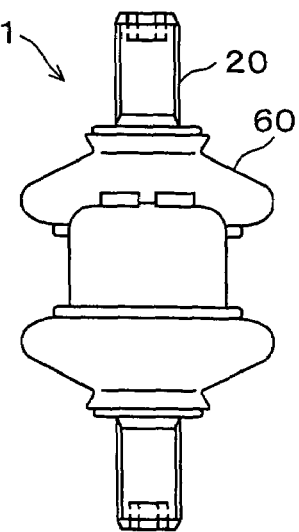
Figure 1C:
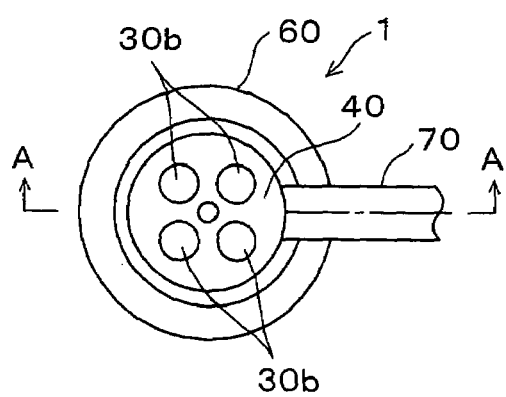

A description will be given below of an embodiment in accordance with the present invention with reference to the accompanying drawings.

FIG. 1 shows a ball joint 1 used in a connection portion of a stabilizer for a vehicle. The ball joint 1 in accordance with the embodiment is provided with a ball stud 20 having a spherical head portion 20a in an end portion, a ball seat 30 to which the spherical head portion 20a is slidably fitted, and a housing 40 to which the ball seat 30 is pressure inserted so as to receive the ball seat 30. A rivet-like engagement portion 30b formed in a bottom portion of the ball seat 30 extends through a bottom portion of the housing 40 so as to engage therewith, whereby the ball seat 30 is clamped to the housing 40, so that it is possible to prevent the ball seat 30 from rotating around an axis and coming off from the housing 40. Further, one end of a support bar 70 is firmly fixed to the housing 40.

Figure 2A:
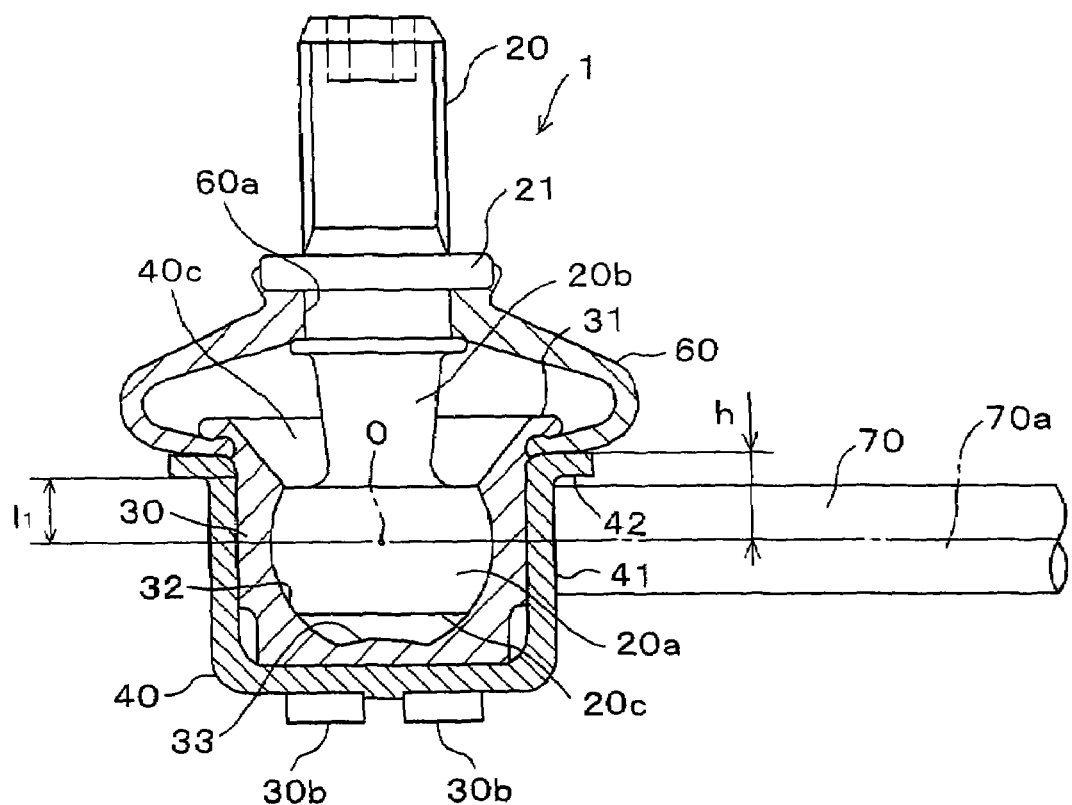
FIG. 2A is side an elevational view showing the ball joint shown in FIG. 1A in an enlarged manner.

The ball stud 20 pivots in the ball seat 30 in a universal manner around the spherical head portion 20a, that is, in such a manner as to freely tilt and rotate around the axis. FIG. 2 is a view showing the ball joint 1, in accordance with the embodiment, in an enlarged manner. As shown in FIG. 2A, a shaft portion 20b connected to the spherical head portion 20a of the ball stud 20 is formed in a tapered shape tapered toward the spherical head portion 20a. Further, a front end portion of the spherical head portion 20a has a large portion cut off, and a flat portion 20c is formed thereat. A distance from a center O of the spherical head portion 20a to the flat portion 20c is set to be 0.25 to 0.4 times the diameter of the spherical head portion 20a.

Figure 2B:
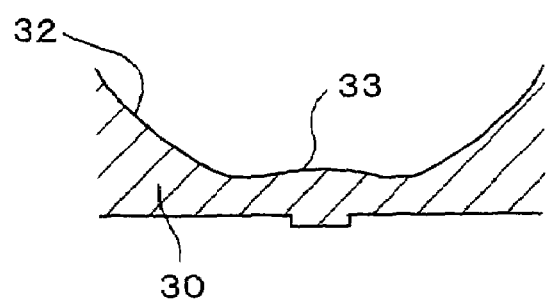
FIG. 2B is a side cross sectional view showing a bottom portion of a ball seat enlarged.

The ball seat 30 is formed in a closed-end cylindrical shape having a flange portion 31 in an upper end edge, and a spherical seat 32 to which the spherical head portion 20 is fitted is formed in an inner portion thereof. As shown in FIG. 2B, a convex portion 33 which is thicker than a peripheral portion is formed in a center of a bottom portion of the ball seat 30. The ball seat 30 is formed, for example, by a resin such as a polyacetal, a polybutylene terephthalate or the like. A bevel-like dust cover 60 is provided between the flange portion 31 of the ball seat 30 and a flange portion 21 formed in the ball stud 20. The dust cover 60 has an opening 60a which the shaft portion 20b penetrates.

The housing 40 is structured such that a flange portion 42 is integrally formed in an upper end edge of a closed-end cylindrical main body portion 41, and an inner portion thereof is formed as a receiving portion for the ball seat 30. The main body portion 41 has an opening 40c from which the shaft portion 20b projects upward. A thickness of the flange portion 42 is made thinner than a thickness of the main body portion 41. Further, an outer radius of curvature of a cross section in a crossing portion between the main body portion 41 and the flange portion 42 is made smaller than the thickness of the main body portion 41.

Figure 3A:
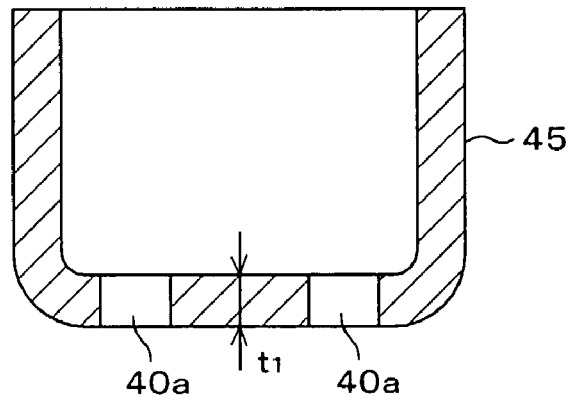
FIGS. 3A, 3B and 3C are side cross sectional views showing a method of forming a housing in accordance with an embodiment in the order of FIGS. 3A to 3C.

Next, a description will be given of a method of manufacturing the housing 40 with reference to FIG. 3. For manufacturing the housing 40, a transfer metal mold in which a plurality of working stages are provided in one metal mold is preferably employed. First, as shown in FIG. 3A, a formed body 45 having the shape of the housing is draw molded from a steel plate. Next, a hole 40a to which the engagement portion 30b of the ball seat 30 is inserted is formed in the next working stage. In this state, the formed body 45 has a uniform thickness $t_1$.

Figure 3B:
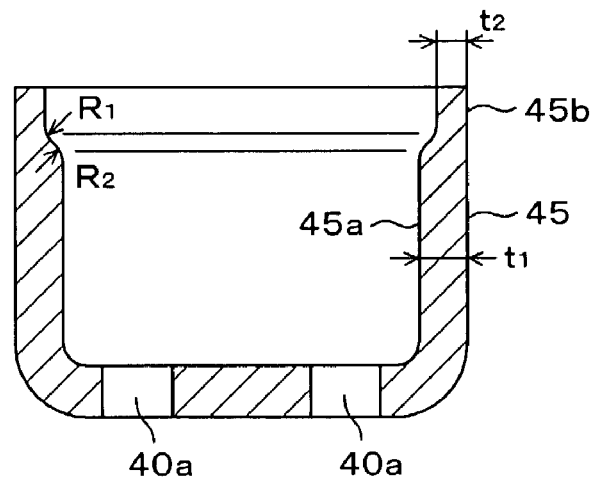

Next, the formed body 45 is set in a lower mold (not shown) of the next stage so as to clamp an outer periphery, and a punch is inserted to an opening portion of the formed body 45. Accordingly, a thickness near the opening portion moves to a side of the opening portion, whereby the thickness is reduced. Therefore, as shown in FIG. 3B, a portion 45a having the thickness $t_1$ of the raw material and a portion 45b having a thickness $t_2$ thinner than the thickness $t_1$ are formed in a tubular portion of the formed body 45, and these two portions 45a and 45b are smoothly connected by curved surfaces having radii $R_1$ and $R_2$ of curvature. In this embodiment, the thickness $t_2$ is set to be about 60% of the thickness $t_1$, whereby it is possible to make the radius $R_2$ of curvature smaller than the thickness $t_1$.

Figure 3C:
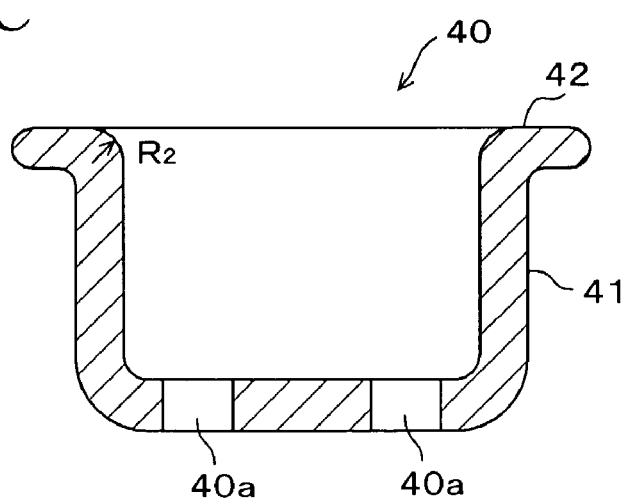
Figure 4A:
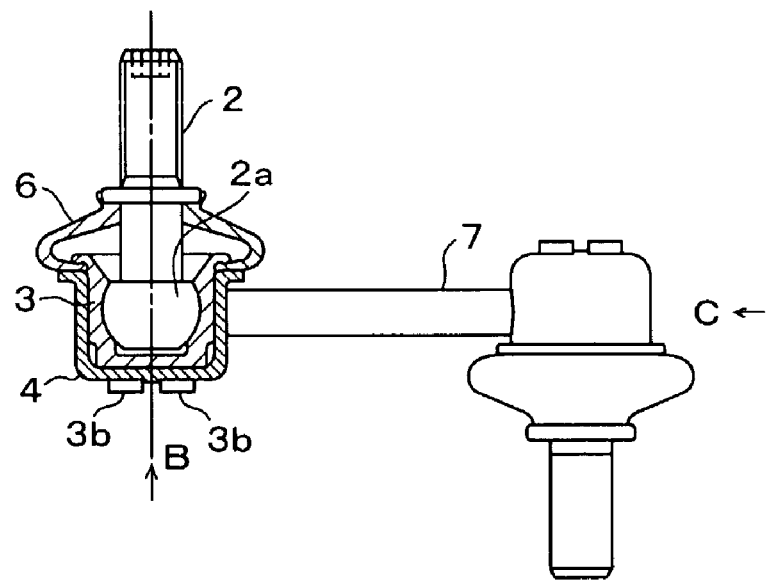
Figure 4B:
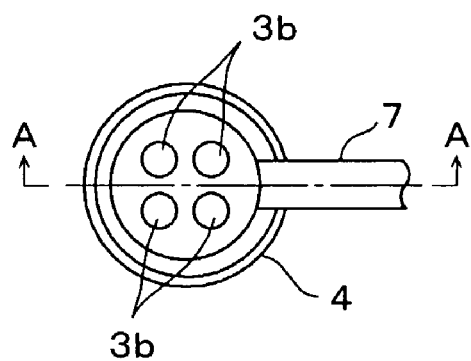
Figure 4C:
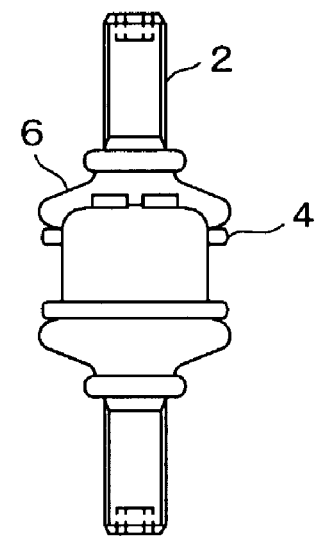
Figure 5:
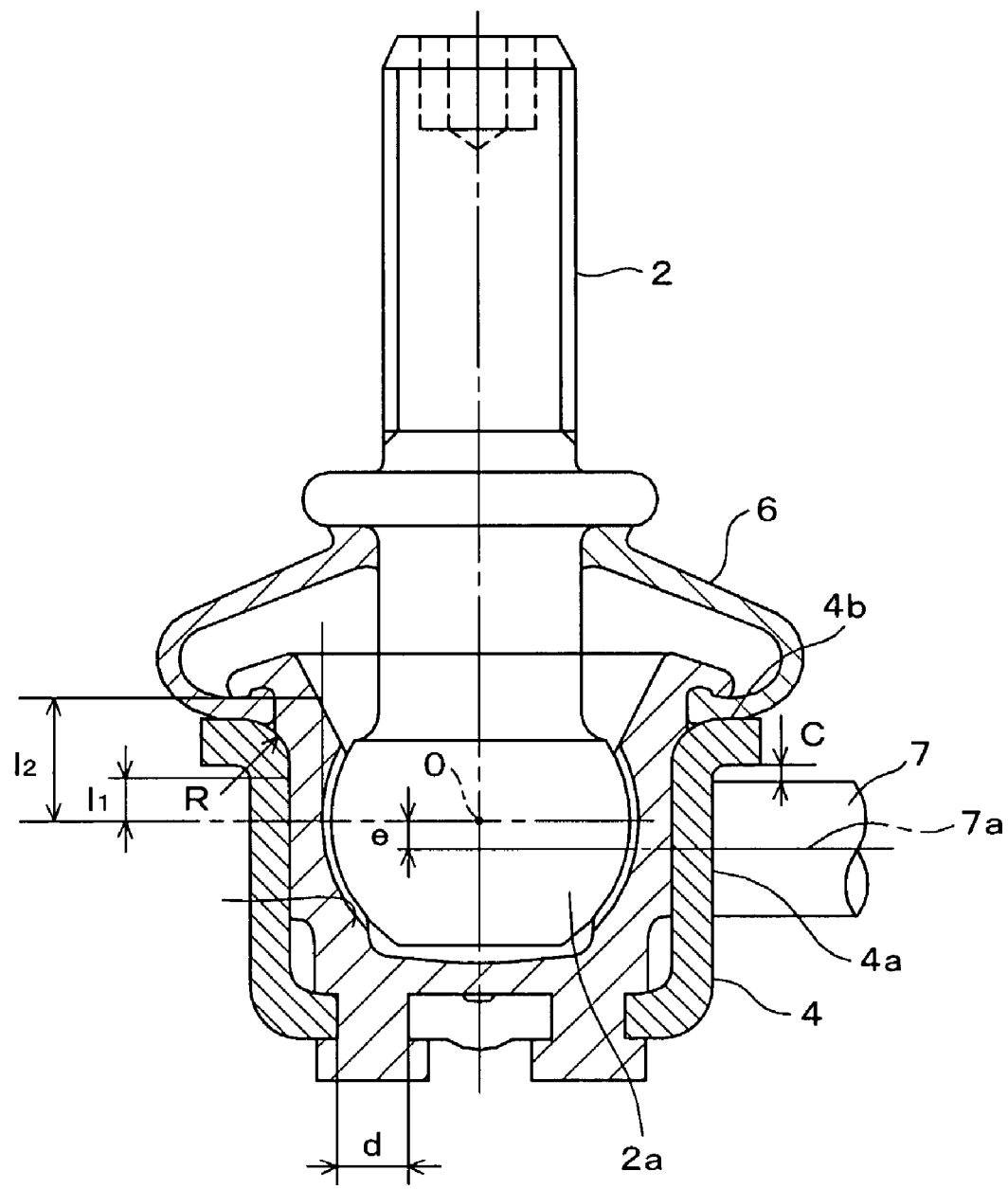
FIG. 5 is a view showing the ball joint shown in FIG. 4A enlarged.

Next, the formed product 45 is transferred to the next stage, and as shown in FIG. 3C, is expanded by the portion having the radius $R_2$ of curvature, whereby the housing 40 constituted by the main body portion 41 and the flange portion 42 is formed. In this case, in the crossing portion between the main body portion 41 and the flange portion 42, the radius $R_2$ of curvature formed by the thickness reduction mentioned above is left as it is. Accordingly, an outer radius of curvature of the crossing portion is smaller than the thickness $t_1$ of the raw material.

In the ball joint 1 having the structure mentioned above, since the flange portion 42 is compression molded so as to be thinner than the thickness of the main body portion 41, it is possible to reduce a size h from a center line 70a of the support bar 70 to an end surface of the flange portion 42. Accordingly, it is possible to increase a tensile strength and a buckling strength of the support bar 70. In particular, in the embodiment mentioned above, since the outer radius $R_2$ of curvature in the cross section of the crossing portion between the flange portion 42 and the main body portion 41 is made smaller than the thickness $t_1$, the distance $l_1$ of the linear portion of the housing inner peripheral surface is long, whereby it is possible to increase the drawing strength of the ball stud 20.

Further, in the embodiment mentioned above, since it is possible to form the structure to be as thin as possible while preventing the bottom portion from being cracked, by cutting off a large part of the front end portion of the spherical head portion 20a so as to form the flat portion, and forming the convex portion 33 in the center of the bottom portion in the ball seat 30, it is possible to arrange the ball stud 20 significantly closer to the bottom portion side. As a result, as shown in FIG. 2A, the center O of the spherical head portion 20a is arranged on the center line 70a of the support bar 70, and it is possible to substantially completely prevent the bending moment from being generated in the support bar 70. Further, in the embodiment mentioned above, since the shaft portion 20b of the ball stud 20 is formed in the tapered shape, there is an advantage that a wide angle of swing can be secured.

What is claimed is:

1. A ball joint comprising:
    a ball stud having a shaft portion and a spherical head portion provided in an end portion of the shaft portion;
    a ball seat to which the spherical head portion is slidably fitted, thereby pivoting the ball stud universally, the ball seat comprising:
        a bottom portion; and
        a convex portion formed at a center of the bottom portion that projects upwards towards the spherical head portion;
    a gap formed between the bottom portion of the ball seat and the spherical head portion of the ball stud;
    a housing receiving the ball seat, the housing being structured such that a closed-end cylindrical main body portion and a flange portion extending outward in a radial direction from the distal edge of the main body portion are formed in accordance with a sheet metal process, and the housing having an outer surface and a support bar extending outwardly from the outer surface, the cylindrical main body portion having an opening from which the shaft portion projects upward; and
    a dust cover having an opening which the shaft portion projecting from the opening of the housing penetrates, the dust cover covering the opening of the housing, and being sandwiched between the ball seat and the flange portion of the housing so as to be fixed on the housing,
    wherein the flange portion has a thickness smaller than a thickness of the main body portion, and
    wherein a center of the convex portion has a thickness larger than a periphery of the convex portion.

2. A ball joint according to claim 1, wherein an outer radius of curvature in a cross section of the crossing point between the flange portion and the main body portion has a thickness smaller than a thickness of the main body portion.

3. A ball joint according to claim 1, wherein the shaft portion has a tapered shape which is tapered toward the spherical head portion side.

4. A ball joint according to claim 1, wherein the spherical head portion has a flat portion formed at a bottom portion side of the spherical head portion, and the distance between a center of the spherical head portion and the flat portion is 0.25 to 0.4 times the diameter of the spherical head portion.

5. A ball joint according to claim 1, wherein the support bar comprises a center line, and a center of the spherical head portion of the ball stud is substantially arranged on the center line of the support bar.

6. A ball joint according to claim 1, wherein the housing is draw molded from a metallic plate having a uniform thickness.

* * * * *